(12) United States Patent
Garlick et al.

(10) Patent No.: US 8,547,993 B1
(45) Date of Patent: Oct. 1, 2013

(54) ASYNCHRONOUS INTERFACE FOR COMMUNICATING BETWEEN CLOCK DOMAINS

(75) Inventors: Lincoln G. Garlick, Santa Clara, CA (US); Richard A. Silkebakken, Santa Clara, CA (US); Prakash G. Apte, Westford, MA (US); Paolo E. Sabella, San Francisco, CA (US); Samuel H. Duncan, Arlington, MA (US); Dennis K. Ma, San Jose, CA (US); Sean J. Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1590 days.

(21) Appl. No.: 11/463,682

(22) Filed: Aug. 10, 2006

(51) Int. Cl.
*H04L 12/66* (2006.01)
*H04L 29/06* (2006.01)

(52) U.S. Cl.
CPC ..................................... *H04L 29/06* (2013.01)
USPC ........... 370/463; 370/419; 370/420; 370/421; 370/449

(58) Field of Classification Search
None
See application file for complete search history.

(56) References Cited

U.S. PATENT DOCUMENTS

| | | | |
|---|---|---|---|
| 6,959,398 B2* | 10/2005 | Shah et al. | 713/600 |
| 7,051,222 B2* | 5/2006 | Wyatt et al. | 713/323 |
| 2004/0109468 A1* | 6/2004 | Anjanaiah | 370/463 |
| 2005/0216247 A1* | 9/2005 | Ikeda et al. | 703/19 |

* cited by examiner

*Primary Examiner* — Faruk Hamza
*Assistant Examiner* — Aixa A Guadalupe-Cruz
(74) *Attorney, Agent, or Firm* — Kilpatrick Townsend & Stockton LLP (57) ABSTRACT

Methods, apparatuses, and systems are presented for performing asynchronous communications involving using an asynchronous interface to send signals between a source device and a plurality of client devices, the source device and the plurality of client devices being part of a processing unit capable of performing graphics operations, the source device being coupled to the plurality of client devices using the asynchronous interface, wherein the asynchronous interface includes at least one request signal, at least one address signal, at least one acknowledge signal, and at least one data signal, and wherein the asynchronous interface operates in accordance with at least one programmable timing characteristic associated with the source device.

23 Claims, 6 Drawing Sheets

ASYNCHRONOUS INTERFACE FOR COMMUNICATING BETWEEN CLOCK DOMAINS

BACKGROUND OF THE INVENTION

Asynchronous interfaces represent a widely used format for communications between components in a system. Such interfaces are especially useful when the various components with which communication is to be established have different clock domains. An asynchronous interface can send data signals without sending an accompanying clock signal. The sender of the asynchronous data may have one clock domain, and the receiver may have a different clock domain and still be able to correctly receive the asynchronous data. Specifically, components with different clock domains do not need additional resources for clock conversion to synchronize to any transmitted clock signals.

The operation of an asynchronous interface depend on the use of timing characteristics such as set-up times and hold times. These timing characteristics specify important tolerances in the timing of signals. The design of a system that utilizes an asynchronous interface takes such tolerances into account to ensure that components can correctly transmit and receive asynchronous signals in spite of factors such as non-uniform propagation delays, variances in clock speeds of different components, etc.

Timing considerations affect the layout of components and interconnections within a system implemented, for example, in a semiconductor device. The layout may need to be created in view of the timing of asynchronous signals, so that interface communications can be conducted properly. The design of a system employing an asynchronous interface is thus intrinsically tied to the timing characteristics associated with the interface.

Indeed, the configuration of a system including its physical layout is often planned around fixed timing characteristics. While this allows the system to be safely designed to meet requirements on signal timing, the resulting design is one that is relatively inflexible. Changes to the design may lead to timing violations.

Just as an example, a system may be designed to provide asynchronous interface communications for a particular group of components. The timing characteristics associated with the asynchronous interface may be set at values that are optimized while accommodating the various clock speeds of the existing components. If the design of the system is modified by inserting a new component into the system, the original timing characteristics may no longer be appropriate. For instance, the newly inserted component may have a much slower clock speed that requires the timing characteristics to be adjusted. In this situation, the design of the entire system may need to be re-worked because other portions of the system may be configured to rely upon the original timing characteristics.

Alternatively, the designed of the system may also be modified by deleting one of the existing component. It may be the case that without the deleted component, the timing characteristics can be improved to speed up the asynchronous interface. After all, the interface no longer has to accommodate the deleted component. Thus, the original timing characteristics may be optimized to new values. Again, the design of the entire system may need to be re-worked because other portions of the system may be configured to rely upon the original timing characteristics.

In yet another example, the system may be updated such that one or more components within the system may run at new clock speeds. The original timing characteristics may no longer be optimal or even functional given the new clock speeds used. Thus, the timing characteristics may need to be changed from their original values. Once again, a change of the timing characteristics may lead to a redesign of the entire system.

Thus, timing considerations for an asynchronous interface can have a tremendous impact on the design of an overall system. At the same time, the cost of redesigning systems, e.g., changing the physical layout of a semiconductor device, can be quite considerable and even prohibitive. As such, there exists a significant need for a manner of specifying timing characteristics such that expensive system redesigns can be avoided.

BRIEF SUMMARY OF THE INVENTION

The present invention relates to methods, apparatuses, and systems for performing asynchronous communications involving using an asynchronous interface to send signals between a source device and a plurality of client devices, the source device and the plurality of client devices being part of a processing unit capable of performing graphics operations, the source device being coupled to the plurality of client devices using the asynchronous interface, wherein the asynchronous interface includes at least one request signal, at least one address signal, at least one acknowledge signal, and at least one data signal, and wherein the asynchronous interface operates in accordance with at least one programmable timing characteristic associated with the source device.

The at least one programmable timing characteristic may includes an address set-up time, an address hold time, and/or a data wait time between detection of the at least one acknowledgement signal and reading of the at least one data signal.

The at least one programmable timing characteristic may be variable as a hardware design parameter. The at least one programmable timing characteristic may also be variable using one or more VBIOS commands. Further, the at least one programmable timing characteristic may be variable using software instructions to be carried out by the processing unit.

In one embodiment of the invention, the at least one request signal comprises a common request signal sent to all of the plurality client devices. In another embodiment of the invention, the at least one request signal comprises a different request signal sent to each of the plurality of client devices. In this embodiment, even when separate request lines are used, the address signals and data signals continue to be shared signals to facilitate convenient addition and/or deletion of client devices from the system.

DETAILED DESCRIPTION OF THE INVENTION

Figure 1:
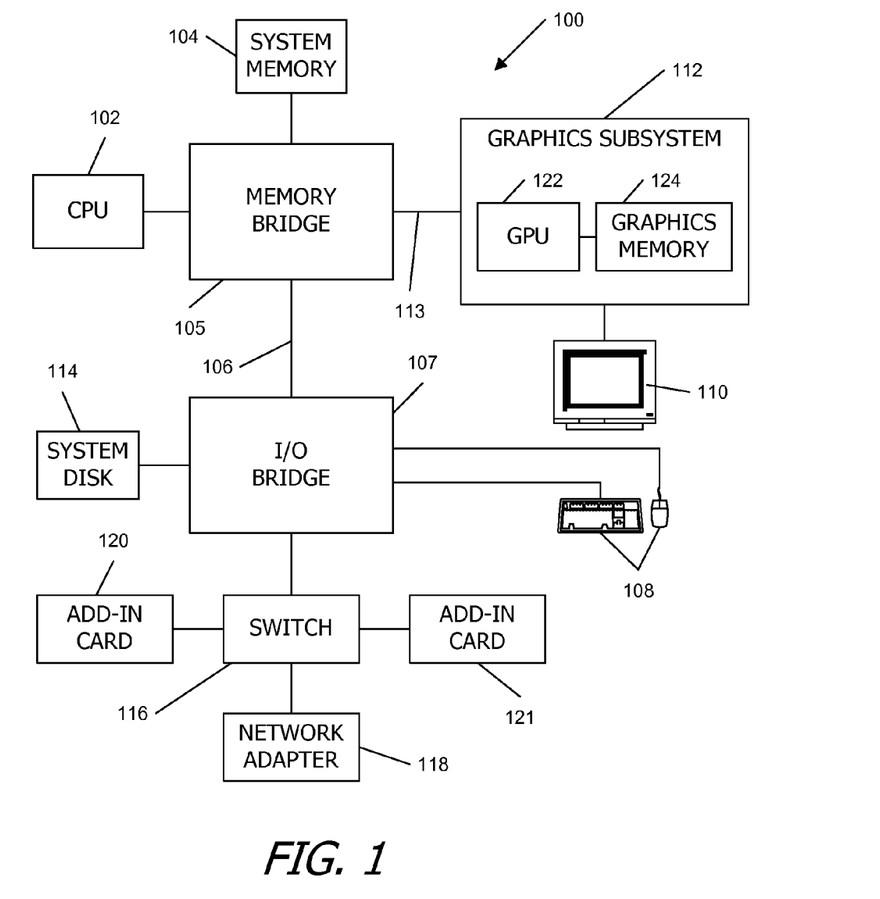
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2 D or 3 D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add in cards or peripheral devices might be supported. In some embodiments, switch 116 is eliminated, and network adapter 118 and add in cards 120, 121 connect directly to I/O bridge 107.

The connection of GPU 122 to the rest of system 100 may also be varied. In some embodiments, graphics system 112 is implemented as an add in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
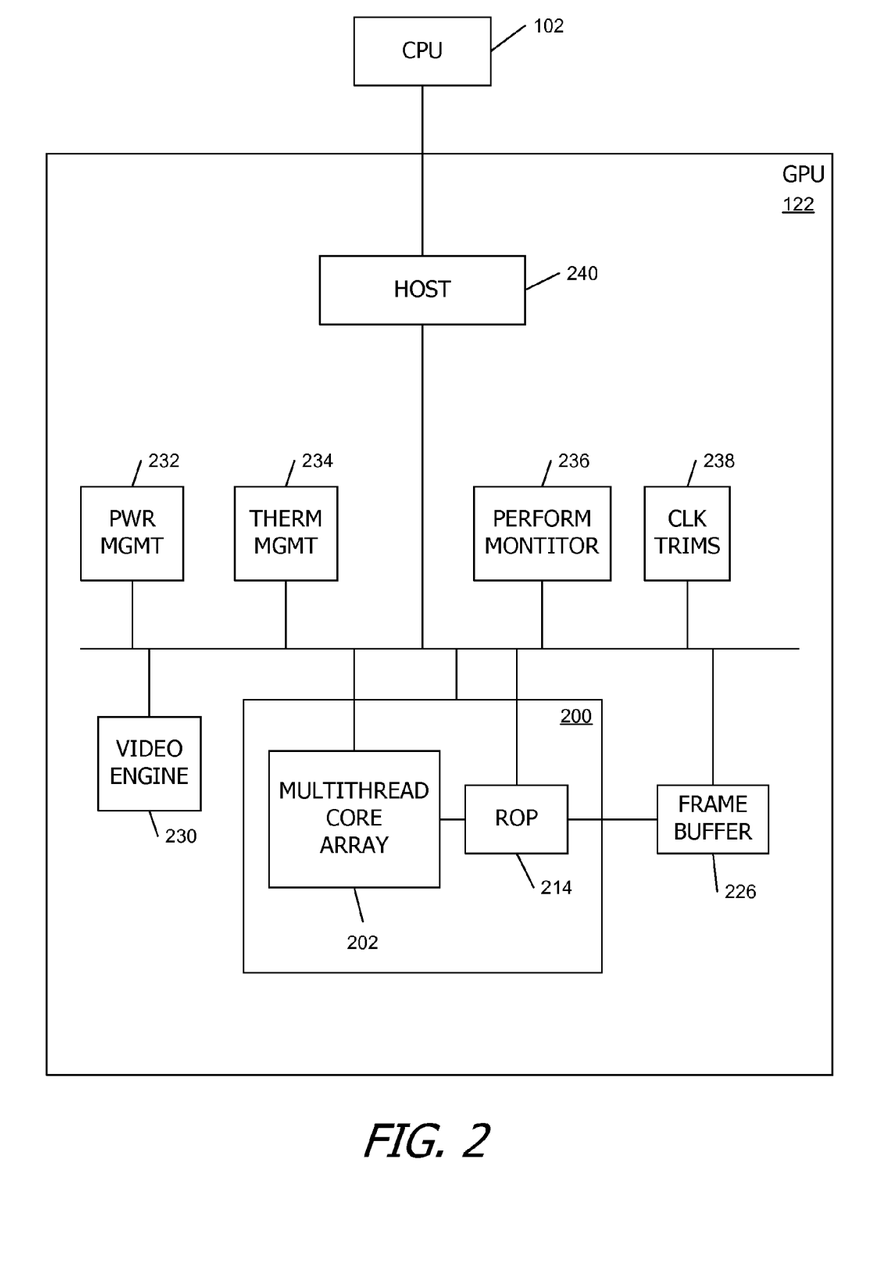
FIG. 2 is a block diagram of illustrative components within the graphics processing unit (GPU) of FIG. 1 coupled together using an asynchronous interface according to an embodiment of the present invention.

FIG. 2 is a block diagram of illustrative components within GPU 122 of FIG. 1 coupled together using an asynchronous interface according to an embodiment of the present invention. For example, these components may include graphics rendering engine 200, frame buffer 226, video engine 230, power management unit 232, thermal management unit 234, performance monitor 236, clock trim unit 238, and a host 240. The components shown here are only examples of components that may be coupled to the asynchronous interface. These may be typical subsystems in a graphics processing unit.

The asynchronous interface may also be coupled to individual units internal to a particular component. For example, as shown in FIG. 2, the asynchronous interface is also coupled to a multithread core array 202 and a raster operations module (ROP) 214 located within graphics rendering engine 200.

The various components shown in FIG. 2 are discussed below. Host 240 acts as a conduit that allows communications between CPU 102 and the rest of the components coupled to the asynchronous interface. For example, in response to CPU 102, host 240 may perform reads and writes to registers located on the various components. Power management unit 232 monitors power usage of various portions of GPU 122. Thermal management unit 232 obtains measurements relating to thermal effects on board GPU 122. Performance monitor 236 obtains different measures of system performance such as processing speed, etc. Clock trims unit 238 regulate the usage of different clocks in GPU 122. Video engine 230 is responsible for video processing such as video compression and decompression in accordance with one or more standards such as a Moving Picture Expert Group (MPEG) standard. Graphics rendering engine 200 is responsible for graphics processing and is described in more detail in the following sections. Frame buffer 226 is used to store data for frames of rendered images.

Graphics rendering engine 200 is typically designed as a pipelined device and thus is also referred to here as rendering pipeline 200. Rendering pipeline 200 may be implemented using an architecture in which any applicable vertex shader programs, geometry shader programs, and pixel shader programs are executed using the same parallel processing hardware, referred to herein as a "multithreaded core array" 202.

Rendering pipeline 200 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Rendering pipeline 200 directs the state information and rendering commands via a control path (not explicitly shown) to various components of rendering pipeline 200. As is known in the art, these components may respond to received state information by storing or updating values in various control registers that are accessed during processing and may respond to rendering commands by processing data received in the pipeline.

Rending pipeline 200 directs programmable processing engines (not explicitly shown) in multithreaded core array 202 to execute vertex and/or geometry shader programs on the received data, with the programs being selected in response to the state information provided. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, the graphics rendering pipeline may utilize a rasterizer, which may be of generally conventional design, to determine which (if any) pixels are covered by the primitive, e.g., using conventional scan conversion algorithms. As used herein, a "pixel" (or "fragment") refers generally to a region in 2 D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

Pixel shader programs can be used to implement a variety of visual effects, including lighting and shading effects, reflections, texture blending, procedural texture generation, and so on. Numerous examples of such per pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124 and/or within GPU 122. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. Further, multiple instances of some or all of the modules described herein may be operated in parallel.

Figure 3:
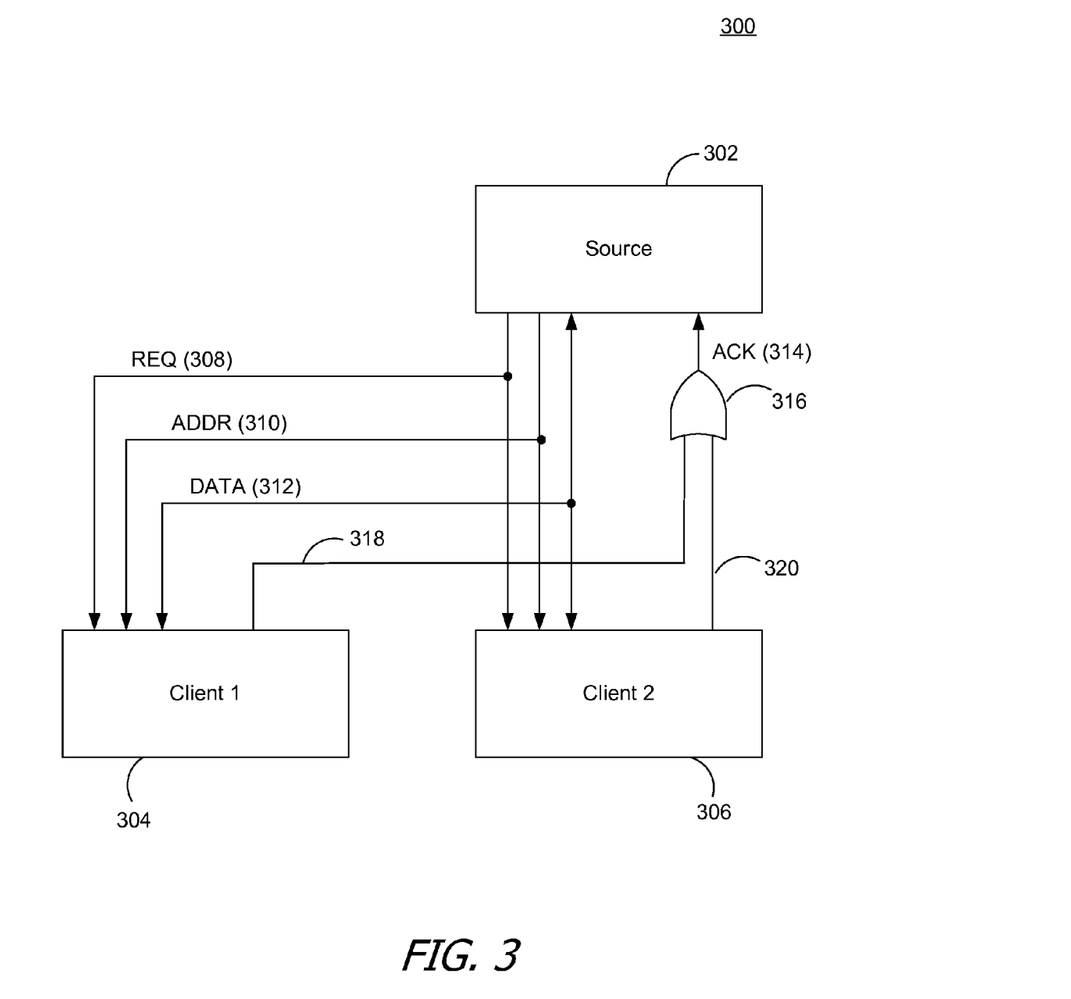
FIG. 3 is a simplified block diagram of an illustrative system utilizing an asynchronous interface according to an embodiment of the present invention.

FIG. 3 is a simplified block diagram of an illustrative system 300 utilizing an asynchronous interface according to an embodiment of the present invention. System 300 may represent a group of components with which asynchronous communication may be established within GPU 122 shown in FIG. 2. Here, system 300 comprises a source device 302 coupled to a plurality of client devices, shown as client device 1 (304) and client device 2 (306). As described here, devices such as source device 302 and client devices 304 and 306 may refer to subsystems within a semiconductor design.

Source device 302 may be a component that controls asynchronous communications within GPU 122. For example, source device 302 may be host 204 in GPU 122, as shown in FIG. 2. Client devices such as client device 1 (302) and client device 2 (304) may represent different subsystems within GPU 122 with which asynchronous communications is to be established. Examples of client devices may include graphics rendering engine 200, ROP 214, frame buffer 226, video engine 230, power management unit 232, thermal management unit 234, performance monitor 236, and clock trim unit 238. While FIG. 3 only shows two client devices to simplify illustration, it should be understood that numerous client devices may be coupled to the asynchronous interface according to the present embodiment of the invention.

The asynchronous interface allows source device 302 to read data from and write data to any of the client devices such as client device 1 (304) and client device 2 (306). Typically, each client device is associated with a plurality of readable and/or writable registers. The registers of all the various client devices may be organized together to form an overall register address space. That is, the registers associated with each client device may occupy a distinct portion of the overall register address space. In this manner, each client device can easily determine whether one of its registers is being accessed by simply observing the address specified in any read or write cycle.

The reads and writes to these registers provide an efficient way of communicating with the various client devices. Each device may be controlled by writing to appropriate registers associated with the device. Also, data generated by each device, such as status information, may be obtained by reading from appropriate registers associated with the device.

Referring to FIG. 3, source device 302 is coupled to client device 1 (304) and client device 2 (306) using an asynchronous interface, which comprises a request signal 308, an address signal 310, a data signal 312, and an acknowledgement signal 314. These signals are shown as single lines in this figure for ease of illustration. However, it should be understood that some of these signals may comprise multiple lines. Just as an example, address signal 310 may represent a 32-bit address that is actually implemented using 32 individual, physical paths.

According to the present embodiment of the invention, request signal 308 is a common signal that is sent from source device 302 to all of the client devices. That is, the same request signal 308 is sent to each client device. In other embodiments, a different request signal may be sent to each client device. Address signal 310 is also a common signal that is sent from source device 302 to all of the client devices.

Here, data signal 312 is a bidirectional signal that can either be (1) sent from source device 302 to all of the client devices (e.g., writing data from source device 302 to one of the client devices), or (2) sent from any one of the client devices to source device 302 (e.g., reading data from one of the client devices to source device 302).

According to the present embodiment of the invention, the acknowledgement signal 314 is a combined signal that combines the individual acknowledgement signals 318 and 320 generated by the various client devices, such as client device 1 (304) and client device 2 (306). As shown in the figure, the individual acknowledgement signals from the various client devices are combined using an OR gate 316. Thus if any of the individual acknowledgment signals 318 and 320 is asserted by a client device, the combined acknowledgement signal 314 is asserted.

A typical read cycle using the asynchronous interface begins with source device 302 placing the desired address to be read on address signal 310 and asserting the request signal 308. The client device whose address range covers the address indicated on address signal 310 responds by placing the data stored at that address on data signal 312 and asserting the client device's individual acknowledgement signal, such as 318 or 320. Regardless of which individual acknowledgement signal is asserted, it causes the combined acknowledgement signal 316 to be asserted. The source device 302 responds to the combined acknowledgement signal by reading the data indicated on data signal 312, thus completing the read cycle.

A typical write cycle using the asynchronous interface begins with source device 302 placing the desired address to be written to on address signal 310 and the data to be written on data signal 312, and asserting the request signal 308. Here, a different request signal (not shown) dedicated for write cycles may be used, depending on implementation. In any case, the client device whose address range covers the address indicated on address signal 310 responds by reading the data indicated on data signal 312 and writing the data to the correct address and asserting the client device's individual acknowledgement signal, such as 318 or 320. Regardless of which individual acknowledgement signal is asserted, it causes the combined acknowledgement signal 316 to be asserted. The source device 302 receives the combined acknowledgement signal, thus completing the write cycle.

In one embodiment of the invention, additional signals such as "is_read" and/or "is_write" (not shown in FIG. 3) may also be included along with request, address, and data signals to help distinguish between read cycles and write cycles.

Here, address signal 310 and data signal 312 are shown in simplified form. These signals may be tri-state type signals that can have a "1" state, a "0" state, or a "high-impedance" state. Also, data signal 312 may be divided into separate data write signals and data read return signals. In one embodiment, the data read return signals sent from the various client devices, such as client device 1 (304) and client device 2 (306), are OR'd together before being provided to the source device, in a similar fashion as combined acknowledgement signal 314 shown in FIG. 3. In such an embodiment, one of the client devices (the one being read by the source device) drives its data read return signals to proper states reflecting the data, while the other client devices drives their data read return signals to state "0."

Figure 4:
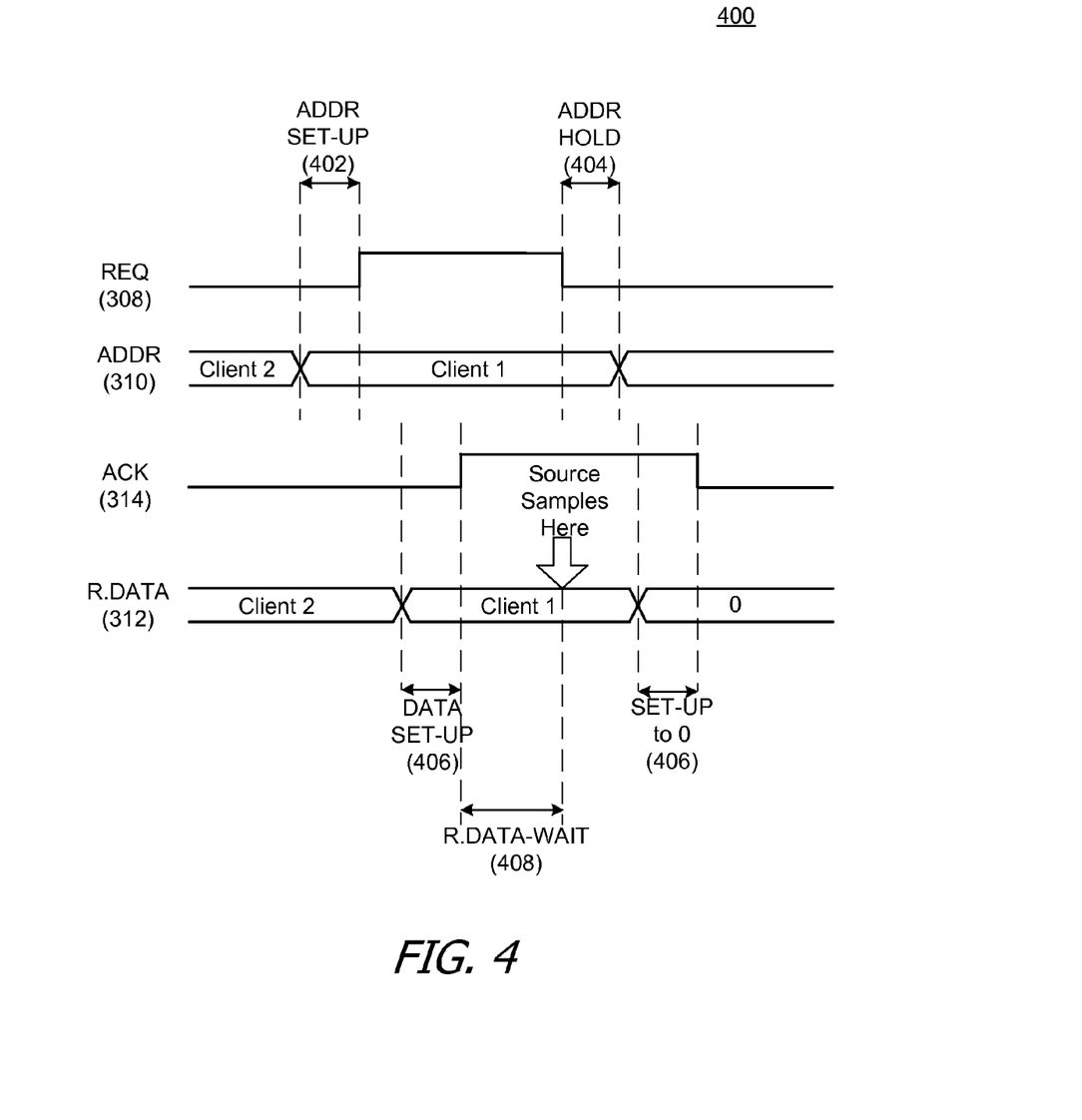
FIG. 4 is a timing diagram showing various timing characteristics according to an embodiment of the invention.

FIG. 4 is an illustrative timing diagram showing various timing characteristics according to an embodiment of the invention. The source and client devices are configured to detect "edges," or changes in the state of signals being monitored. While "edge" detect signals are shown here, "level" detect signals may be used in other embodiments of the invention. Furthermore, the source and client devices are configured to assert and de-assert signals in accordance with various timing characteristics. The timing characteristics shown in the figure include address_set-up_time 402, address_hold_time 404, data_set-up_time 406, read_data_wait_time 408, and set-up_to_zero time 410.

A read cycle is presented here for purposes of illustration. However, it should be understood that the invention may be applicable to write cycles as well. As shown in the figure, the read cycle begins with the source device 302 placing a desired address on address signal 310 and asserting the request signal 308. Here, the source device 302 places an address in the address range of client device 1 (address shown as "client 1") on address signal 310 and asserts the request signal 308.

Source device 302 ensures that it places the desired address (shown as "client 1") on address signal 310 for at least an amount of time equivalent to address_set-up_time 402 before asserting the request signal 308. Also, source device 302 ensures that it maintains the desired address (shown as "client 1") on address signal 310 for at least an amount of time equivalent to address_hold_time 404 before de-asserting the request signal 308. Here, time may be measured in units of cycles of a clock, such as a system clock.

Referring still to FIG. 4, the read cycle continues as the client device whose address range includes the desired address placed on address signal 310 responds. Here, client device 1 (304) responds by placing the data stored at the desired address on the data signal 312 and asserting acknowledge signal 314. As described previously, client device 1 (304) may do this by asserting its individual acknowledgement signal 318 (not shown in FIG. 4), which is OR'ed together with other individual acknowledgement signals to produced acknowledgement signal 314.

Client device 1 (304) ensures that it places the data read from the desired address on data signal 312 for at least an amount of time equivalent to data_set-up_time 406 before asserting the acknowledge signal 314. Client device 1 (304) also ensures that it places the value "zero" on data signal 312 for at least an amount of time equivalent to set-up_to_zero_time 410 before de-asserting the acknowledgement signal 314. At the completion of the read cycle, the client device asserts the value "zero" on data signal 312 to reduce the likelihood that data from one cycle may corrupt data from another cycle.

Source device 302 samples data signal 312 upon detecting that a client device has asserted acknowledgement signal 314. To take into account delays associated with the client device as well as other delays, source device 302 waits an amount of time equivalent to return_data_wait_time 408 before sampling data signal 312.

Typically, timing characteristics address_set-up_time 402, address_hold_time 404, and return_data_wait_time 408 are fixed at particular values determined by taking into account the behavior of the client devices served by the asynchronous interface. There may be many different reasons why a particular client device may require more lenient timing characteristics. For example, a client device may have a slower clock and therefore be slower to respond to the assertion and de-assertion of signals. Also, a client device may be located relatively far away from source device 302 and thus be associated with a longer signal propagation delay.

According to the present embodiment of the invention, timing characteristics such as address_set-up_time 402, address_hold_time 404, and return_data_wait_time 408 are designed to be programmable values that can be changed. Programmability allows these timing characteristics to be changed to appropriate values depending on the behavior of client devices in different situations. For example, timing characteristics can be adjusted to maximize the speed of the asynchronous interface while meeting the timing requirements of the existing client devices.

In one embodiment of the invention, one or more timing characteristics may be variable as hardware design parameters. This introduces significant flexibility into the design of systems that employ asynchronous interfaces. For example, a particular system design may be re-used in a different system or a different generation of the same system, without violating fixed timing requirements. Various timing characteristics can simply be re-programmed to meet the requirements of the new system, without completely redesigning the system from scratch to meet the new timing requirements.

Also, the methodology of designing hardware can be made more flexible. A basic design may be generated with less rigid timing considerations. Because timing characteristics are programmable, circuit timing behavior that otherwise would be considered timing violations can be accommodated by the system more easily.

Default values for programmable timing characteristics may also be set within the hardware design. For example, a particular timing characteristic may be assigned a default value, which may be utilized in most situations. In other situations, the programmable timing characteristic may be changed to different values as needed.

Separately or additionally, one more programmable timing characteristics may be variable using Video Basic Input/Output System (VBIOS) commands that a system executes upon start up. Using VBIOS commands, a system may be adjusted to alter programmable timing characteristics depending on the needs of the system. Just as an example, VBIOS commands may be used for "clock gating" a system, whereby one or more clock speeds of the system are sped up or slowed down from their original values. Programmable timing characteristics may then be set to values optimized for the new clock speeds used.

Separately or additionally, one or more programmable timing characteristics may be variable using software instructions to be carried out by the processing unit. Here, the processing unit may be GPU 122 or CPU 102. Such software instructions may be part of a software program that may include features which take into account the usage of different client devices. For example, a software program may recognize that for a particular application, only a certain group of client devices are active and need to communicate using the asynchronous interface. This information allows timing characteristics to be programmed that are optimized for this particular group of client devices.

As another example, a power management mode in which certain portions of a system are powered down or put in a less active state may also utilize the programmable timing characteristics. Thus, if in a particular power management mode certain clock speeds are slowed down, the programmable timing characteristics can be set to values appropriate for such clock speeds. Also, if in a particular power management mode, only a certain group of client devices are active, then the programmable timing characteristics can be optimized for only that group of client devices.

In one embodiment of the invention, programmable timing characteristics can be dynamically changed by the source device, based on the specific target client device involved in the read or write cycle. For example, the source device may decode the address being asserted to determine which client device is being accessed, thereby determining a set of timing characteristics appropriate for that client device.

In one embodiment of the invention, only timing characteristics controlled by the source device are made programmable. For example, in FIG. 4, the timing characteristics controlled by the source device are address_set-up_time 402, address_hold_time 404, and read_data_wait_time 408. This embodiment allows programmable timing characteristics to be adopted with minimal disruption to the rest of the system. Specifically, only the source device needs to be modified such that it incorporates programmable timing characteristics. The configuration of client devices need not be changed. Thus, the source device can adopt programmable timing characteristics and thereby greatly improve the flexibility and performance of the asynchronous interface, without making any adjustments in the client devices.

Figure 5:
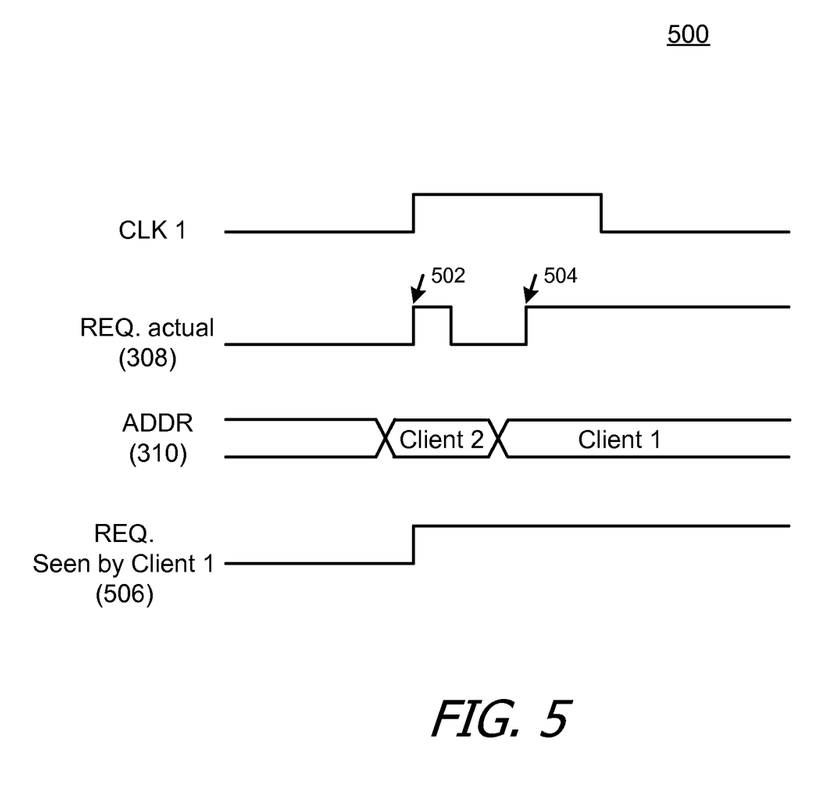
FIG. 5 is a timing diagram illustrating a potential "missed request" problem experienced by a client device having a slow clock.

FIG. 5 is a timing diagram illustrating a potential "missed request" problem experienced by a client device having a slow clock. This problem relates to how a device having a slow clock can fail to keep up with the source device and other client devices, and thus become out of sync with the asynchronous interface. As shown in the figure, two consecutive read cycles are issued by source device 302. The first read cycle is directed to client device 2 (306), which has a fast clock in the current example. The second read cycle is directed to client device 1 (304), which has a slow clock in the current example.

In the figure, the clock of client device 1 is shown as CLK 1. This clock is sufficiently slow such that the read cycle associated with client device 2 may be completed without client device 1 recognizing so. Specifically, client device 1 detects the first assertion of request signal 308 corresponding to the read cycle for client device 2. In other words, client device 1 detects rising edge 502. However, client device 1 does not sample the request signal 308 until the next rising edge of CLK 1. Thus, client device misses rising edge 504. As such, the request signal as seen by client device 1 is shown as signal 506.

Because of its slow clock, client device 1 fails to detect a number of events that have taken place. In particular, the request signal 308 has been de-asserted and the read cycle directed to client device 2 has completed. Also, a new read cycle directed to client device 1 has been started. Client device 1 completely misses these events, including the assertion of request signal 308 corresponding to the read cycle of client device 1 (rising edge 504). At this point, client device 1 is out of sync with the asynchronous interface. Client device 1 becomes unable to conduct proper asynchronous exchanges and can actually corrupt the asynchronous interface.

Figure 6:
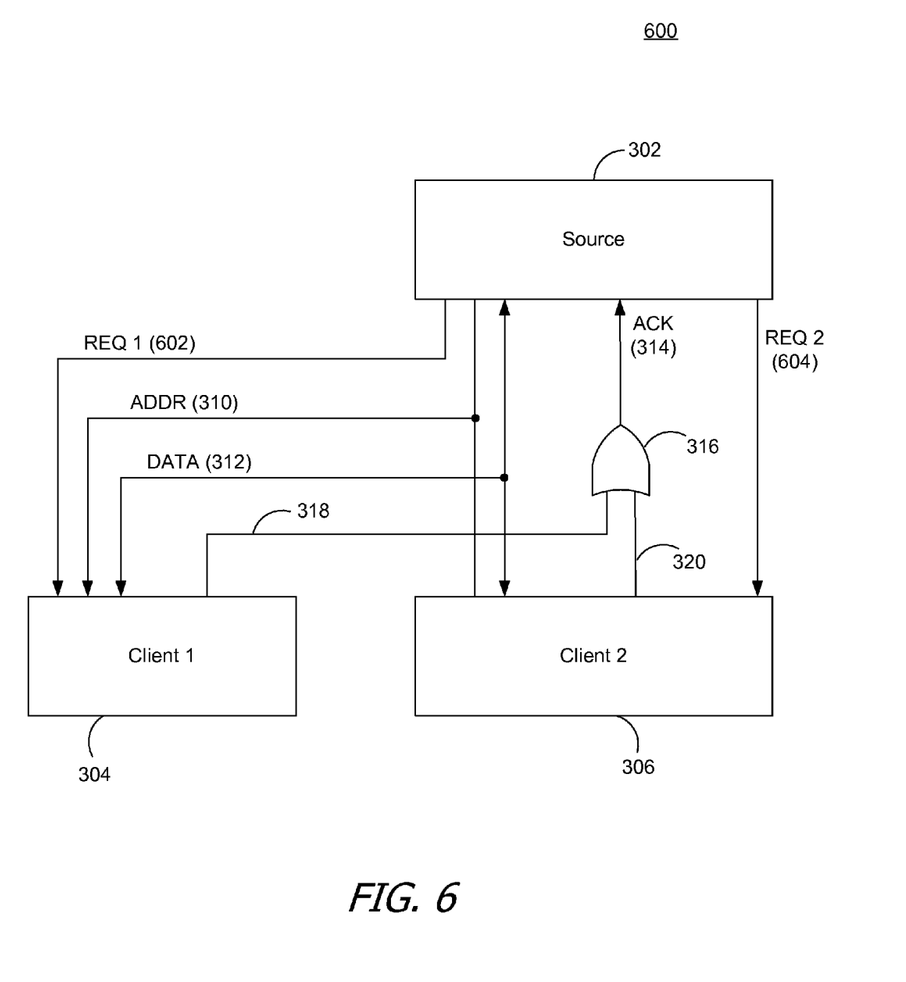
FIG. 6 is a block diagram of an illustrative system utilizing an asynchronous interface having a separate request line for each client device in accordance with an embodiment of the present invention.

FIG. 6 is a block diagram of an illustrative system 600 utilizing an asynchronous interface having a separate request line for each client device in accordance with an embodiment of the present invention. System 600 may represent a group of components with which asynchronous communication may be established within GPU 122 shown in FIG. 2. Here, system 300 comprises a source device 302 coupled to a plurality of client devices, shown as client device 1 (304) and client device 2 (306). System 600 is similar to system 300 in many respects. This includes the operation of address signal 310, data signal 312, combined acknowledge signal 314, and individual acknowledge signals 318 and 320, which have been described previously in system 300.

However, unlike system 300, system 600 does not utilize a common request signal sent from source device 302 to all of the client devices. Instead, system 300 utilizes a different request signal that is sent from source device 302 to each client device. As shown in the figure, source device 302 sends a request signal 602 to client device 1 (304). Source device 302 sends a separate request signal 604 to client 2 (306). The use of separate request signals for different client devices can ease many of the problems associated with sharing a request line amongst differently-behaved client system.

For instance, the "missed request" problem described with respect to FIG. 5 can be addressed using separate request lines. The problem of the missed request is caused in part by the fact that client device 1, because of its slower clock, cannot keep up with events that have occurred in the asynchronous interface, especially events relating to other client devices which have faster clocks and operate faster.

A dedicated request line allows client device 1 to receive only requests directed to client device 1 and no other requests. Thus, client device 1 is not required to keep track of events such as read requests directed to client device 2. Such a request would be sent on a different dedicated request signal 604 to client device 2. Client device 1 is thereby relieved of the burden of having to keep up with asynchronous interface events relating to other, faster client devices. The use of separate request lines thus reduces the likelihood of timing problems associated with different client devices, especially when such client devices have clocks of greatly varied speeds. In the present embodiment, even when separate request lines are used, the address signals and data signals continue to be shared signals as described previously, to facilitate convenient addition and/or deletion of client devices from the system.

In one embodiment of the invention, separate request lines may be used without programmable timing characteristics. The use of separate request lines may sufficiently address timing problems without needing to employ programmable timing characteristics. Of course, in such an embodiment, the flexibility associated with programmable timing characteristics may not be realized.

In another embodiment of the invention, programmable timing characteristics are used without separate request lines. In certain implementations, the additional resources required to provide separate request lines may not be necessary if use of programmable timing constraints allow enough improvements in timing constraints. For instance, timing characteristics may be programmed to values that incorporate enough leeway to resolve difficulties such as "missed request" problems.

In yet another embodiment of the invention, separate request lines are used in conjunction with programmable timing characteristics to take advantage of the benefits of both improvements and allow the asynchronous interface to be flexibly designed to achieve robustness and improved speed.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing asynchronous communication comprising:
    using an asynchronous interface to send signals between a source device and a plurality of client devices, the source device and the plurality of client devices being part of a processing unit to perform graphics operations, the source device being coupled to the plurality of client devices using the asynchronous interface;
    wherein the asynchronous interface signals include at least one request signal, at least one address signal, at least one acknowledge signal, and at least one data signal;
    wherein the asynchronous interface sends the at least one address signal and at least one data signal in accordance with at least one programmable timing characteristic associated with the source device; and
    wherein when the source sends data to one of the plurality of client devices, the source uses the at least one address signal to determine the one of the plurality of client devices and set the at least one programmable timing characteristic
    wherein the at least one programmable timing characteristic comprises at least one of an address set-up time, an address hold time, a data set-up time, or a data wait time between detection of the at least one acknowledgement signal and reading of the at least one data signal.

2. The method of claim 1 wherein the at least one programmable timing characteristic includes an address set-up time.

3. The method of claim 1 wherein the at least one programmable timing characteristic includes an address hold time.

4. The method of claim 1 wherein the at least one programmable timing characteristic includes a data wait time between detection of the at least one acknowledgement signal and reading of the at least one data signal.

5. The method of claim 1 wherein the at least one programmable timing characteristic is variable as a hardware design parameter.

6. The method of claim 1 wherein the at least one programmable timing characteristic is variable using one or more VBIOS commands.

7. The method of claim 1 wherein the at least one programmable timing characteristic is variable using software instructions to be carried out by the processing unit.

8. The method of claim 1 wherein the at least one request signal comprises a common request signal sent to all of the plurality client devices.

9. The method of claim 1 wherein the at least one request signal comprises a different request signal sent to each of the plurality of client devices.

10. The method of claim 1 wherein the request signal is asserted when the asynchronous interface performs a read or a write operation, the acknowledge signal is received by the asynchronous interface in response to an assertion of the request signal, the asynchronous interface provides the address signal, and the data signal is a bidirectional signal.

11. An apparatus for performing asynchronous communications comprising:
    a source device;
    a plurality of client devices, the source device and the plurality of client devices being part of a processing unit to perform graphics operations;
    an asynchronous interface coupling the source device to the plurality of client devices, the asynchronous interface to send interface signals between the source device and the plurality of client devices;
    wherein the interface signals comprise at least one request signal, at least one address signal, at least one acknowledge signal, and at least one data signal; and
    wherein the asynchronous interface sends the interface signals in accordance with at least one programmable timing characteristic associated with the source device;
    wherein when one or more of the plurality of client devices changes to a less active state, the at least one programmable timing characteristic is changed,
    wherein the at least one programmable timing characteristic comprises at least one of an address set-up time, an address hold time, a data set-up time, or a data wait time between detection of the at least one acknowledgement signal and reading of the at least one data signal.

12. The apparatus of claim 11 wherein the at least one programmable timing characteristic includes an address set-up time.

13. The apparatus of claim 11 wherein the at least one programmable timing characteristic includes an address hold time.

14. The apparatus of claim 11 wherein the at least one programmable timing characteristic includes a data wait time between detection of the at least one acknowledgement signal and reading of the at least one data signal.

15. The apparatus of claim 11 wherein the at least one programmable timing characteristic is variable as a hardware design parameter.

16. The apparatus of claim 11 wherein the at least one programmable timing characteristic is variable using one or more VBIOS commands.

17. The apparatus of claim 11 wherein the at least one programmable timing characteristic is variable using software instructions to be carried out by the processing unit.

18. The apparatus of claim 11 wherein the at least one request signal comprises a common request signal capable of being sent to all of the plurality client devices.

19. The apparatus of claim 11 wherein the at least one request signal comprises a different request signal capable of being sent to each of the plurality of client devices.

20. The apparatus of claim 11 wherein the one or more of the plurality of client devices changes to a less active state when the one or more of the plurality of client devices are inactive and do not need to communicate using the asynchronous interface.

21. The apparatus of claim 11 wherein the one or more of the plurality of client devices changes to a less active state when the one or more of the plurality of client devices are powered down.

22. A system for performing asynchronous communications comprising:
- means for using an asynchronous interface to send signals between a source device and a plurality of client devices, the source device and the plurality of client devices being part of a processing unit to perform graphics operations, the source device being coupled to the plurality of client devices using the asynchronous interface;
- wherein the asynchronous interface includes at least one request signal, at least one address signal, at least one acknowledge signal, and at least one data signal; and
- wherein the asynchronous interface sends the at least one address signal and at least one data signal in accordance with at least one programmable timing characteristic associated with the source device;
- wherein when one of the plurality of client devices enters a lower-power state, the at least one programmable timing characteristic is changed,
- wherein the at least one programmable timing characteristic comprises at least one of an address set-up time, an address hold time, a data set-up time, or a data wait time between detection of the at least one acknowledgement signal and reading of the at least one data signal.

23. The system of claim 22 wherein when the one of the plurality of clients enters a lower-power state, the one of the plurality of clients is off.

* * * * *